United States Patent [19]

Brooks

[11] 4,416,713

[45] Nov. 22, 1983

[54] METHOD AND APPARATUS FOR JOINING ABUTTING EDGES OF SHEET MATERIAL

[76] Inventor: Ronald H. Brooks, 6 Baxter Ct., Chelsea, Victoria, Australia

[21] Appl. No.: 171,865

[22] Filed: Jul. 24, 1980

[51] Int. Cl.³ .............................................. B32B 31/26
[52] U.S. Cl. .................................. 156/64; 156/273.9; 156/275.1; 156/304.4; 156/304.6; 156/367; 156/378; 156/379.7; 156/391; 156/502; 219/485; 219/487; 219/489; 219/497; 219/501; 428/62
[58] Field of Search ...................... 156/64, 275, 304.4, 156/304.6, 304.7, 367, 391, 502, 378, 324.4, 273.9, 275.1, 379.7; 428/62; 219/485, 487, 489, 497, 501

[56] References Cited

U.S. PATENT DOCUMENTS

| 3,734,795 | 5/1973 | Griffith | 156/304.4 X |
| 3,816,203 | 6/1974 | Bascom et al. | 156/304.4 X |
| 4,205,223 | 5/1980 | Cole | 219/501 |

FOREIGN PATENT DOCUMENTS

| 453405 | 5/1972 | Australia . |
| 464878 | 8/1972 | Australia . |
| 1154629 | 6/1969 | United Kingdom . |
| 1269066 | 3/1972 | United Kingdom . |
| 1328346 | 8/1973 | United Kingdom . |
| 1490437 | 11/1977 | United Kingdom . |
| 1507851 | 4/1978 | United Kingdom . |
| 1567632 | 5/1980 | United Kingdom . |

OTHER PUBLICATIONS

"Brooks Super Glide-On", Manufacturer's Brochure (Australia) undated.

Primary Examiner—Robert A. Dawson
Attorney, Agent, or Firm—Pollock, Vande Sande & Priddy

[57] ABSTRACT

A method and apparatus for adhesively bonding together in edge abutting relationship two sheets of woven, felted or other textile such as carpet using a joining tape which includes electrically conductive-metal foil or wires and an integral layer of heat softenable adhesive. Electric current is passed through the foil or wires to thereby heat and soften the adhesive. A control circuit senses the voltage and current in the foil or wires and controls the current in accordance with an adjustable predetermined value to heat the adhesive to a temperature at which the adhesive becomes tacky. The control circuit maintains the adhesive in the tacky state while the abutting edges which overlap the tape are adjusted as required to form the desired join. The control circuit is then adjusted to increase the current in the foil or wires to increase the temperature thereof and melt the adhesive so that it flows into the material of the sheets. The current is terminated when the adhesive is fully melted so that the adhesive sets to bond the edge portions of the sheets to the tape.

8 Claims, 3 Drawing Figures

METHOD AND APPARATUS FOR JOINING ABUTTING EDGES OF SHEET MATERIAL

BACKGROUND OF THE INVENTION

This invention relates to an improved method of joining together fabric or other sheet material, particularly floor covering material such as carpets, and apparatus therefor.

Sheet materials, such as carpets, are commonly joined edge to edge by sewing the adjacent edges together. In some instances, the carpet is "made", i.e., the edges are joined together, prior to the carpet being delivered to the site of its installation, although machines are now available for sewing the carpet in situ. However, such sewing is time consuming and therefore relatively costly, and many types of carpet or other sheet material are unsuitable for joining by sewing.

It is well known to join adjacent edges of sheet material, such as carpets, by adhesive means. More recently, adhesive bonding of carpet edges has become standard practice with the advent of both pressure sensitive adhesives applied to a carpet joining tape and heat activated adhesives on a carpet joining tape or backing.

Australian Pat. No. 464,878 describes a carpet bonding tape which consists of a layer of heat insulating materials such as paper, a layer of metal foil and an upper layer of a ribbon of heat softenable adhesive composition, the nature and thickness of the ribbon of heat softenable adhesive composition being such that an adhesive bond is formed with the underside of a carpet material when the tape is used in an operation in which the carpet material is pressed onto the heat softened adhesive layer. A woven textile material may also be embedded in the ribbon of adhesive material to reinforce the tape.

Many other forms of tape are known which comprise a layer of heat softenable adhesive composition laminated to a paper backing, with a textile reinforcement either secured to the backing or located within the layer of heat softenable adhesive.

Such previously known tapes are generally used in conjunction with a heating iron which applies heat to the tape, either through the backing or through the carpet, to thereby melt the adhesive which then engages with the carpet backing to thereby bond the carpet to the tape, and particularly to the reinforcing textile normally included within the tape.

While such tape and joining methods are relatively successful, difficulty has been found in applying the correct amount of heat and for the required period of time to assure that the adhesive correctly melts and bonds the carpet backing to the tape. Further, the application of too much heat to the surface of the carpet may result in damage being caused to the carpet fibers, particularly if the carpet is formed of a synthetic plastic material such as polypropylene, nylon or the like. Still further, once the carpet is bonded to the tape, any corrections in the pattern matching of the carpet or gaps which appear at the joined seam are difficult, if not impossible, to carry out.

Australian Pat. No. 453,405 describes an improved method of joining sheet material, such as carpet, with heat activated thermoplastic adhesives, wherein a tape comprising a strip of metal foil bearing a heat softenable adherent layer is used, the heat required to activate the thermoplastic adhesive composition being obtained by passing an electric current through the metal foil to thereby cause melting of the adhesive composition and bonding of the adjacent abutting edges of the sheet material.

However, the apparatus required to provide the necessary electric current to the metal foil requires constant supervision by the operator to prevent the foil overheating and thus damaging the sheet material and to assure that the adhesive is melted throughout the length of the tape so that the sheet material edges may be properly joined. Further, once the adhesive has been melted and the electric current removed, the carpet is bonded to the tape, thus preventing corrections for pattern matching or closing gaps which may occur in the seam formed by the joined abutting edges.

It is therefore an object of the present invention to provide an improved method and apparatus for joining sheet material in edge abutting relation whereby the join can be made relatively quickly and simply and yet any corrections which may be necessary can be easily carried out without disturbing correctly abutted edge portions.

It is also an object of the present invention to provide apparatus for use in controlling the heat applied to a heat softenable adhesive so as to enable abutting edge portions of carpet to be quickly and simply joined together.

SUMMARY OF THE INVENTION

In overcoming the problems of the prior art, the present invention provides a method of joining together abutting edges of woven, felted or other textile sheets, such as carpets, using a web which includes a strip of metal foil or electrically conductive wires and a heat softenable adhesive composition, said method comprising the steps of:

(a) contacting the abutting edges of said sheets with said web so that the web overlaps said abutting edges, (b) passing an electric current through the metal foil or electrically conductive wires to generate heat therein, (c) sensing the voltage applied to said metal foil or the electrically conductive wires, (d) sensing the current flowing, (e) controlling the current flow to thereby control the heat generated in the metal foil or electrically conductive wires to maintain a temperature therein at which the said adhesive composition is softened to a tackiness whereby the adhesive releasably bonds the web to the sheets, (f) adjusting the abutting edges as desired to form the required join, (g) thereafter increasing the current flow to raise the web temperature and thereby melt the adhesive, and (h) stopping the current flow to cause the melted adhesive to set and bond the said sheets to the web.

In a preferred aspect of the invention, the web comprises a backing of paper, such as crepe paper, a strip of aluminum foil overlying the paper, a layer of reinforcing filaments such as rayon, glass fiber or the like which extend substantially transversely of the web, and one or more strips of adhesive extending longitudinally of the web overlying the filaments or fiber. The web layers may be laminated together or sewn together by one or more lines of stitching.

It is also preferred that the heat softenable adhesive composition be a thermoplastic adhesive which becomes soft and tacky at a temperature of approximately 175° C. and which melts and is therefore able to flow into the textile sheets at a temperature of between 190° and 250° C..

The invention also provides apparatus for use in joining together abutting edges of woven, felted or other textile sheets, such as carpets, using a web which includes a strip of metal foil or electrically conductive wires and a heat softenable adhesive composition, said apparatus comprising means for connecting an electrical power source to spaced points on said strip of metal foil or electrically conductive wires to enable current to be passed therethrough, means to sense the voltage applied to the metal foil or the electrically conductive wires and means sensing the current flowing therethrough, control means to regulate the current to a predetermined value which will generate heat sufficient to soften the adhesive composition without fully melting the adhesive, and means selectively operated to increase the current to fully melt the adhesive.

In one particular form of the invention, the apparatus includes a transformer adapted to be connected to mains power and to produce an output of approximately 30 volts which is applied to spaced points along the strip of metal foil or electrically conductive wires. Control circuitry limits the current flowing through the foil or electrically conductive wires to a preset value which generates sufficient heat in the metal foil or electrically conductive wires through resistance heating to cause the adhesive composition to become tacky. While the adhesive is maintained in the tacky condition, the abutting edges of the sheets are adjusted to form the desired join or seam. Thereafter, the control circuitry is adjusted to increase the current flowing through the metal foil or electrically conductive wires to increase the heat generated thereby to fully melt the adhesive. The current flow is then terminated so that the adhesive sets, thereby bonding the web to the textile sheets.

BRIEF DESCRIPTION OF THE DRAWINGS

An embodiment of the invention will now be described for purposes of illustration with reference to the accompanying drawings, wherein.

DESCRIPTION OF THE PREFERRED EMBODIMENT

Figure 1:
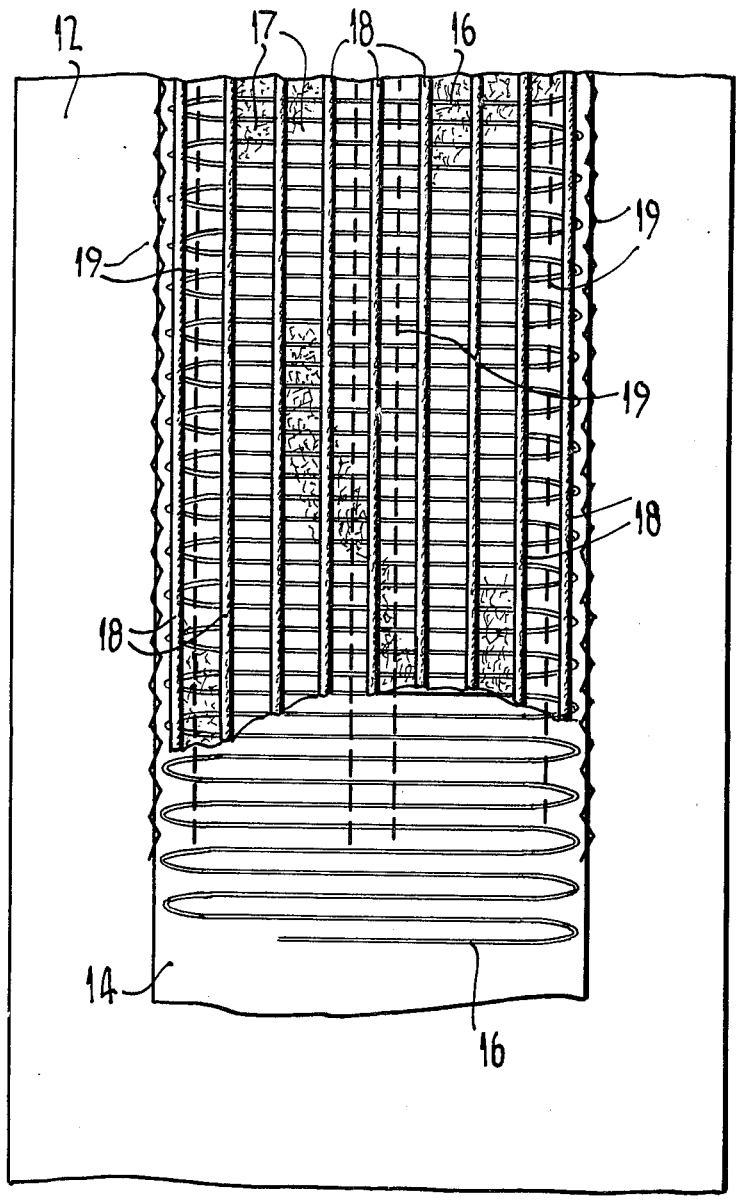
FIG. 1 is an illustrative view of one form of joining tape in accordance with the present invention.

Referring to the drawings, FIG. 1 shows a typical carpet joining tape for use with the method and apparatus of the present invention. The tape comprises a backing 12 formed of a paper material, such as crepe paper which is able to undergo limited extension in the longitudinal direction of the tape. The paper backing 12 provides a support for the subsequent layers of the tape as well as acting as a heat insulator. The paper strip is preferably of a width of approximately 3½ inches.

A layer of metallic foil 14 of approximately 2 inches in width extends the full length of the tape and is substantially centrally located along the paper backing 12.

Reinforcing threads or filaments 16 are disposed on the metallic foil 14 and extend substantially transversely of the tape. The reinforcing threads 16 are preferably a rayon or similar thread which is laid in zigzag fashion across the full width of the metal foil 14. Alternatively, the reinforcing threads or filaments may comprise an open weave or net of textile plastic, glass fibers, metallic thread or wire.

The upper layer of the tape comprises a thermoplastic adhesive material 17 substantially covering the metallic foil 14 and reinforcing threads 16 and having a plurality of longitudinally extending beads 18 upstanding from the surface thereof.

The backing 12, foil 14, reinforcing threads 16 and adhesive material 17 are secured together by a plurality of lines of stitching 19 extending longitudinally of the tape.

The metallic foil 14 is preferably an aluminum alloy of approximately 0.002 inches thickness and having an electrical resistance of between 1 and 5 ohms per 100 yards.

Figure 2:
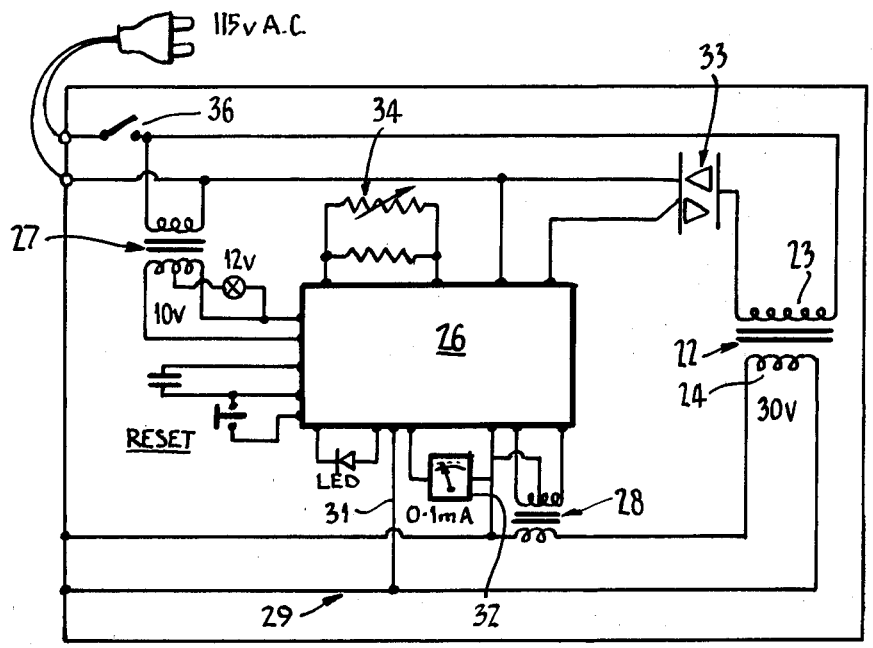
FIG. 2 is a circuit diagram of the control apparatus of the invention.

The adhesive may be formed of any suitable thermoplastic adhesive material which may include waxes, both natural and synthetic, plasticizers and viscosity controllers. A typical formulation of adhesive is as follows:

glycerol ester of rosin—10 to 30 parts
pentaerythritol of hydrogenated rosin—5 to 15 parts
pentaerythritol ester of primarlex resin acid—10 to 20 parts
pentaerythritol ester dimer acid-pentalyn 860—10 to 30 parts
ethylene vinyl acetate—5 to 25 parts
natural or synthetic wax—5 to 10 parts Referring to FIG. 2 of the drawings, the control apparatus for activating the adhesive comprises a power transformer 22 the primary winding 23 of which is adapted to be connected to a mains power source of, for example, 115 volts a.c.. The secondary winding 24 of the transformer 22 produces an output of approximately 30 volts a.c. which is to be applied to spaced points along the length of the metallic foil of the joining tape.

The output power is controlled by a Triac trigger module 26 produced by Selectronic Components Pty. Ltd. and which is the subject of their Australian Patent Application No. PE 1575, dated Dec. 3, 1979. A power supply for the trigger module 26 is derived from a small transformer 27 connected in parallel with the power transformer 22.

A current transformer 28 is connected into the output circuit 29 to sense the current output. Voltage sensing connections 31 are also made between the output circuit 29 and the Triac trigger module 26. A current output indicating meter 32 provides an indication of the output current.

The Triac trigger module 26 controls the firing of a Triac 33 in the input circuit to the power transformer 22. A rheostat 34 allows manual control of the Triac trigger module 26 to vary the operation of the Triac 33. Overload indicating, tripping and resetting circuits 36 and 37 are provided to protect the Triac trigger module 26.

In operation of the control apparatus, the output circuit 29 is connected to each end of the metallic foil 14 in a length of joining tape which is to be used to join abutting edges of a carpet or similar sheet material. The switch 36 is actuated so that current is caused to flow through the metal foil 14. The Triac trigger module 26 senses both the voltage and current outputs and, subject to the setting of the rheostat 34, controls the output currents to a predetermined level set by the rheostat 34. The impedance of the metallic foil 14 and the current flowing therethrough is thereby effectively monitored by the Triac trigger module 26.

The output meter 32 is calibrated in terms of the heating effect of the metal foil 14 whereby a full scale reading of the meter is shown as "heat" and a midscale reading is shown as "hold". In operation of the apparatus, when the adhesive has been heated to a degree where it becomes tacky, the rheostat 34 is adjusted so that the output meter 32 indicates "hold". At this setting, the current applied to the metal foil 14 is sufficient only to maintain the temperature of the foil such that the adhesive remains tacky. At this position, the join between the abutting edges of the carpet can be adjusted as desired. When a suitable join has been made, the rheostat 34 is adjusted so that the meter 32 indicates "heat", and an increased amount of current flows through the metallic foil 14 to increase the heating effect thereof to thereby melt the adhesive composition.

The output current is controlled by the Triac trigger module 26 varying the firing of the Triac 33 in the primary circuit of the power transformer 22 in accordance with the predetermined setting of the rheostat 34. In this manner, the output current is a function of the input power and the Triac 33 operation.

Figure 3:
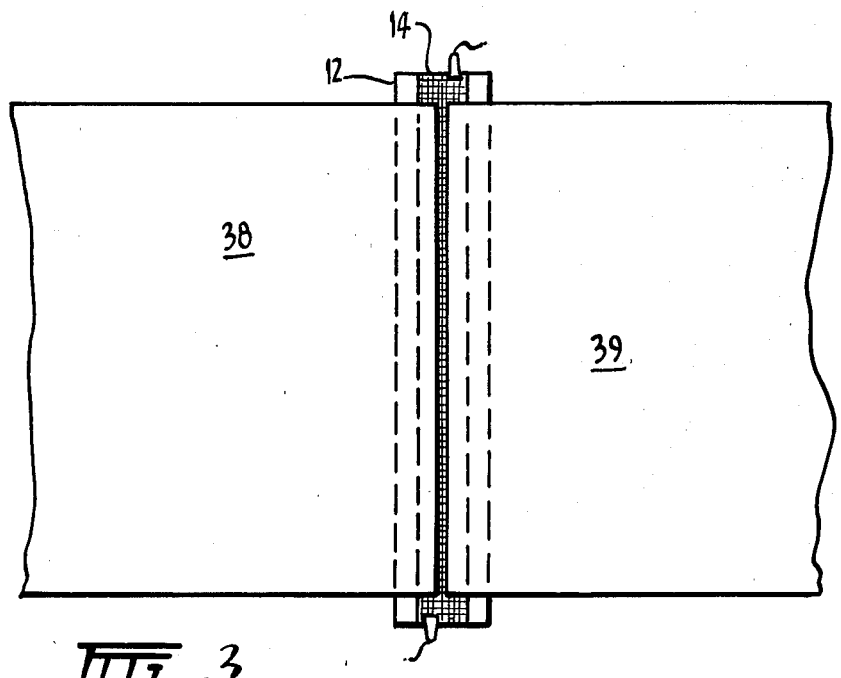
FIG. 3 is a plan view of two pieces of carpet to be joined by the method of the invention.

Referring to FIG. 3, abutting edges of the carpet pieces 38 and 39 are caused to overlap the joining tape along the length thereof so that the edges meet approximately along the middle of the adhesive material 17 on the tape, with the adhesive material 17 being in contact with the backing of the carpet pieces 38 and 39. Leads from the output of the control apparatus are connected to each end of the metal foil 14 in the joining tape, and the control apparatus is switched on so that electric current passes through the metal foil, thereby generating heat in the metal foil.

When sufficient heat has been generated to cause the adhesive material 17 to become tacky, the control apparatus is set to the "hold" position (the current output meter indicates a midscale reading), and the control apparatus maintains sufficient current through the metal foil to maintain the adhesive in the tacky condition.

When the adhesive material 17 becomes tacky, it acts in the manner of a pressure sensitive adhesive so that the carpet edges are lightly bonded together. However, the bond may be released by lifting either, or both of the appropriate edge portions of the carpet pieces 38 and 39 away from the joining tape in a direction at right angles to the plane of the tape to enable adjustments to be made to the join. Such adjustments may be required to enable pattern matching to be carried out and to assure that the edges of the carpet pieces 38 and 39 are closely abutting. When the join has been made as desired, the rheostat 34 on the control apparatus is adjusted so that the current output meter 32 indicates "heat" (full scale reading,) thereby increasing the current flowing through the metal foil 14 and increasing the heat generated therein. The adhesive material 17 fully melts and runs into the backing material of the carpet pieces 38 and 39 to thereby provide a secure bond, when the current is terminated and the adhesive cools, between the carpet pieces 38 and 39, the reinforcing threads 16 and the metal foil 14 and backing 12.

The apparatus of this invention enables carpet which has been joined with the tape of the invention or a similar tape, to be "unjoined" by heating the metal foil in the tape thereby remelting the adhesive. If the join is to be released to enable an adjustment to be made to the seam, the apparatus can be used as hereinbefore described to melt the adhesive to a tacky condition, whereby the adjustments can be made and the adhesive then remelted to finally form the seam.

The apparatus of the invention enables relatively long runs of joins to be made in a single operation. Thus, a length of up to 50 feet may be made in a single operation, or parallel joins of up to 30 feet in length may be carried out. However, the apparatus may easily be adjusted to enable longer lengths of carpet pieces to be joined if desired.

The tape of the present invention enables a carpet to be joined thereby to be stretched along the length of the seam. A stretch of up to 6 inches in a 50 feet long seam may be obtained. The stretch occurs as a result of the use of a crepe paper backing 12, a slightly "creped" or wrinkled metal foil 14 and the omission of longitudinally extending reinforcing threads which would otherwise prevent the tape stretching in the longitudinal direction.

Although the invention has been particularly described with regard to the joining of carpet pieces, it will be immediately appreciated that the invention may be applied to joining other textile or fabric materials, such as wall textiles or fabrics or other similar sheet material.

What is claimed is:

1. A method of joining together abutting edges of woven, felted or other textile sheets, such as carpets, using a web which includes a strip of metal foil or electrically conductive wires and a heat softenable adhesive composition, said method comprising the steps of
   (a) contacting the abutting edges of said sheets with said web so that the web overlaps said abutting edges,
   (b) passing an electric current through the metal foil or electrically conductive wires to generate heat therein,
   (c) sensing the voltage applied to said metal foil or the electrically conductive wires,
   (d) sensing the current flowing,
   (e) controlling the current flow to thereby control the heat generated in the metal foil or electrically conductive wires to maintain a temperature therein at which the said adhesive composition is softened to a tackiness whereby the adhesive releasably bonds the web to the sheets,
   (f) adjusting the abutting edges as desired to form the required join,
   (g) thereafter increasing the current flow to raise the web temperature and thereby melt the adhesive, and
   (h) terminating the current flow when the adhesive has melted to cause the melted adhesive to set and bond the said sheets to the web.

2. A method according to claim 1, wherein said web comprises a backing strip of paper material, a strip of aluminum foil overlying the backing strip, reinforcing threads or filaments on said foil and extending substantially transversely of said strip, and one or more strips of thermoplastic adhesive extending along said foil, the layers being laminated, adhered or sewn together to form an elongated joining tape.

3. A method according to claim 1 wherein the current flow is controlled by selectively controlling the triggering of a Triac in the primary circuit of a power transformer, the secondary circuit of which is connected to said metal foil or electrically conductive wires.

4. A method according to claim 1 wherein the adhesive composition becomes tacky at a temperature of between 160° C. and 180° C. and melts to a flowable condition at a temperature between 180° C. and 250° C.

5. A method according to claim 1 wherein said textile sheets comprise carpet pieces.

6. In apparatus for use in joining together abutting edges of woven, felted or other textile sheets, such as carpets, using a web which has a backing strip of paper or paper like material, a strip of metal foil reinforcing filaments or threads at least some of which extend in a substantially transverse direction, and a heat softenable adhesive composition, said backing strip, metal foil and reinforcing material being secured together by a plurality of lines of stitching extending longitudinally of the web, the improvement comprising
 (a) means for connecting an electrical power source to spaced points on said strip of metal foil to enable current to be passed therethrough;
 (b) means to sense the voltage applied to the metal foil;
 (c) means to sense the current flowing therethrough;
 (d) control means responsive to said voltage sensing means and said current sensing means to regulate the current to a first predetermined value which will generate heat sufficient to soften the adhesive composition to a state of tackiness without fully melting the adhesive, whereby abutted edges of the sheets can be adjusted relative to each other to form the desired join; and
 (e) means selectively operated to increase the current to a second predetermined value to fully melt the adhesive once the desired join is formed.

7. Apparatus for use in joining together abutting edges of woven, felted or other textile sheets, such as carpets, using a web which includes a strip of metal foil or electrically conductive wires and a heat softenable adhesive composition, said apparatus comprising means including a transformer having an output of about 30 volts for connecting an electrical power source to spaced points on said strip of metal foil or electrically conductive wires to enable current to be passed therethrough, means to sense the voltage applied to the metal foil or electrically conductive wires and means to sense the current flowing therethrough, control means including a Triac in the circuit of said transformer to regulate the current to a predetermined value which will generate heat sufficient to soften the adhesive composition without fully melting the adhesive, said Triac being triggered in response to sensed output current and voltage and the predetermined desired current value, and means selectively operated to increase the current to fully melt the adhesive.

8. Appartaus as claimed in claim 7, comprising a Triac trigger module to receive the sensed output current and voltage and to trigger said Triac, a controlling rheostat variable to vary the current output and an ammeter to indicate the output current, said controlling rheostat being operable to vary the output current by varying the triggering of said Triac.

* * * * *